(12) United States Patent
Ash et al.

(10) Patent No.: US 9,384,143 B1
(45) Date of Patent: Jul. 5, 2016

(54) SELECTING CACHE LISTS INDICATING TRACKS IN A CACHE TO PROCESS FOR DEMOTION

(71) Applicant: INTERNATIONAL BUSINESS MACHINES CORPORATION, Armonk, NY (US)

(72) Inventors: Kevin J. Ash, Tucson, AZ (US); Lokesh M. Gupta, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/940,058

(22) Filed: Nov. 12, 2015

(51) Int. Cl.
*G06F 13/00* (2006.01)
*G06F 12/08* (2016.01)

(52) U.S. Cl.
CPC ........ *G06F 12/0895* (2013.01); *G06F 12/0891* (2013.01); *G06F 2212/1032* (2013.01); *G06F 2212/601* (2013.01); *G06F 2212/604* (2013.01)

(58) Field of Classification Search
CPC ......... G06F 12/00; G06F 12/08; G06F 12/12; G06F 13/00
See application file for complete search history.

(56) References Cited

U.S. PATENT DOCUMENTS

8,095,738 B2  1/2012  Benhase et al.

*Primary Examiner* — Charles Rones
*Assistant Examiner* — Han Doan
(74) *Attorney, Agent, or Firm* — David W. Victor; Konrad Raynes Davda & Victor LLP (57) ABSTRACT

Provided are a computer program product, system, and method for selecting cache lists indicating tracks in a cache to process for demotion. In response to a selected cache list indicated as stalled as a result of a determination that there are less than a threshold number of unmodified tracks in the selected cache list, the selected cache list is indicated as not stalled in response to determining that the cache lists other than the selected cache list were indicated as not stalled since the selected cache list was last indicated as not stalled. The selected cache list is processed to determine whether there are unmodified tracks in response to indicating the selected cache list as not stalled. The determined unmodified tracks in the selected cache list are processed for demotion from the cache.

22 Claims, 6 Drawing Sheets

Cache Control Block

FIG. 3

Cache List Information

FIG. 4

List Counters and Limits

SELECTING CACHE LISTS INDICATING TRACKS IN A CACHE TO PROCESS FOR DEMOTION

BACKGROUND OF THE INVENTION

1. Field of the Invention

The present invention relates to a computer program product, system, and method for selecting cache lists indicating tracks in a cache to process for demotion.

2. Description of the Related Art

A cache management system buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency. The cache management system may also return complete to a write request when the modified track directed to the storage device is written to the cache memory and before the modified track is written out to the storage device, such as a hard disk drive. The write latency to the storage device is typically significantly longer than the latency to write to a cache memory. Thus, using cache also reduces write latency.

A cache management system may maintain a linked list having one entry for each track stored in the cache, which may comprise write data buffered in cache before writing to the storage device or read data. In the commonly used Least Recently Used (LRU) cache technique, if a track in the cache is accessed, i.e., a cache "hit", then the entry in the LRU list for the accessed track is moved to a Most Recently Used (MRU) end of the list. If the requested track is not in the cache, i.e., a cache miss, then the track in the cache whose entry is at the LRU end of the list may be removed and demoted and an entry for the track data staged into cache from the storage is added to the MRU end of the LRU list. With this LRU cache technique, tracks that are more frequently accessed are likely to remain in cache, while data less frequently accessed will more likely be removed from the LRU end of the list to make room in cache for newly accessed tracks.

When processes access a track in the cache, a track identifier of the accessed cache needs to be moved to the MRU end of the LRU list. To move a track identifier to the MRU end, a lock needs to be obtained on the LRU list. If multiple processes are trying to access the cache, then contention for the LRU list lock among the multiple processes may delay cache processing. One technique for addressing LRU list lock contention is to provide multiple LRU lists to indicate cached tracks, so that now different processors can simultaneously access the different LRU lists to process tracks in the LRU lists.

Of the multiple LRU lists, an Active LRU list may be provided for random non-Solid State Drive (SSD) tracks, a Fast LRU list may be provided for random SSD tracks, an accelerated LRU list may be provided for sequential tracks, and a demote ready LRU list may be provided for unmodified tracks that are ready to be demoted.

When cache is full, tracks need to be demoted to make room for newly accessed tracks. The LRU lists are scanned to determine unmodified tracks to move to the demote ready LRU list so they may be demoted.

There is a need in the art for improved techniques for selecting tracks for demotion from the cache.

SUMMARY

Provided are a computer program product, system, and method for selecting cache lists in a cache to process for demotion. Tracks in the storage stored in the cache are indicated in a plurality of cache lists. One of the cache lists is indicated as stalled in response to a determination that there are less than a threshold number of unmodified tracks in the cache list. In response to a selected cache list indicated as stalled, a determination is made as to whether the cache lists other than the selected cache list were indicated as not stalled since the selected cache list was last indicated as not stalled. The selected cache list is indicated as not stalled in response to determining that the cache lists other than the selected cache list were indicated as not stalled since the selected cache list was last indicated as not stalled. The selected cache list is processed to determine whether there are unmodified tracks in response to indicating the selected cache list as not stalled. The determined unmodified tracks in the selected cache list are processed for demotion from the cache.

DETAILED DESCRIPTION

In described embodiments, there may be multiple cache lists to indicate tracks in the cache. A cache list may be indicated as stalled if a determination is made that there are no unmodified tracks. If all the cache lists become stalled, then the cache lists must be processed to change the stalled state to not stalled to check if the cache lists now have unmodified tracks that can be processed for demotion. To ensure that all cache lists have their state changed from stalled to not stalled so they may be scanned for unmodified tracks, described embodiments select a cache list and if the cache list is stalled determine whether the cache lists other than the selected cache list were indicated as not stalled since the selected cache list was last indicated as not stalled. The selected cache list is indicated as not stalled to process in response to determining that the cache lists other than the selected cache list were indicated as not stalled since the selected cache list was last indicated as not stalled.

In further embodiments, each of the cache lists may be subdivided into multiple partition lists having tracks in a particular cache list. If all the partition lists become stalled, then the partition lists must be processed to change the stalled state to not stalled to check if the partition lists for a selected cache list now have unmodified tracks that can be processed for demotion. To ensure that all partition lists have a chance to be indicated as not stalled to process, described embodiments select a partition list and if stalled indicate the selected partition list as not stalled so it may be processed for unmodified tracks in response to determining that all the other partition lists for the selected cache list were indicated as not stalled since the selected partition list was last indicated as not stalled.

The described embodiments provide techniques for selecting cache lists and their partition lists for processing for unmodified tracks that alternates among selecting the lists so that all cache and partition lists have an opportunity for being processed and are not continually overlooked and not processed for unmodified tracks.

Figure 1:
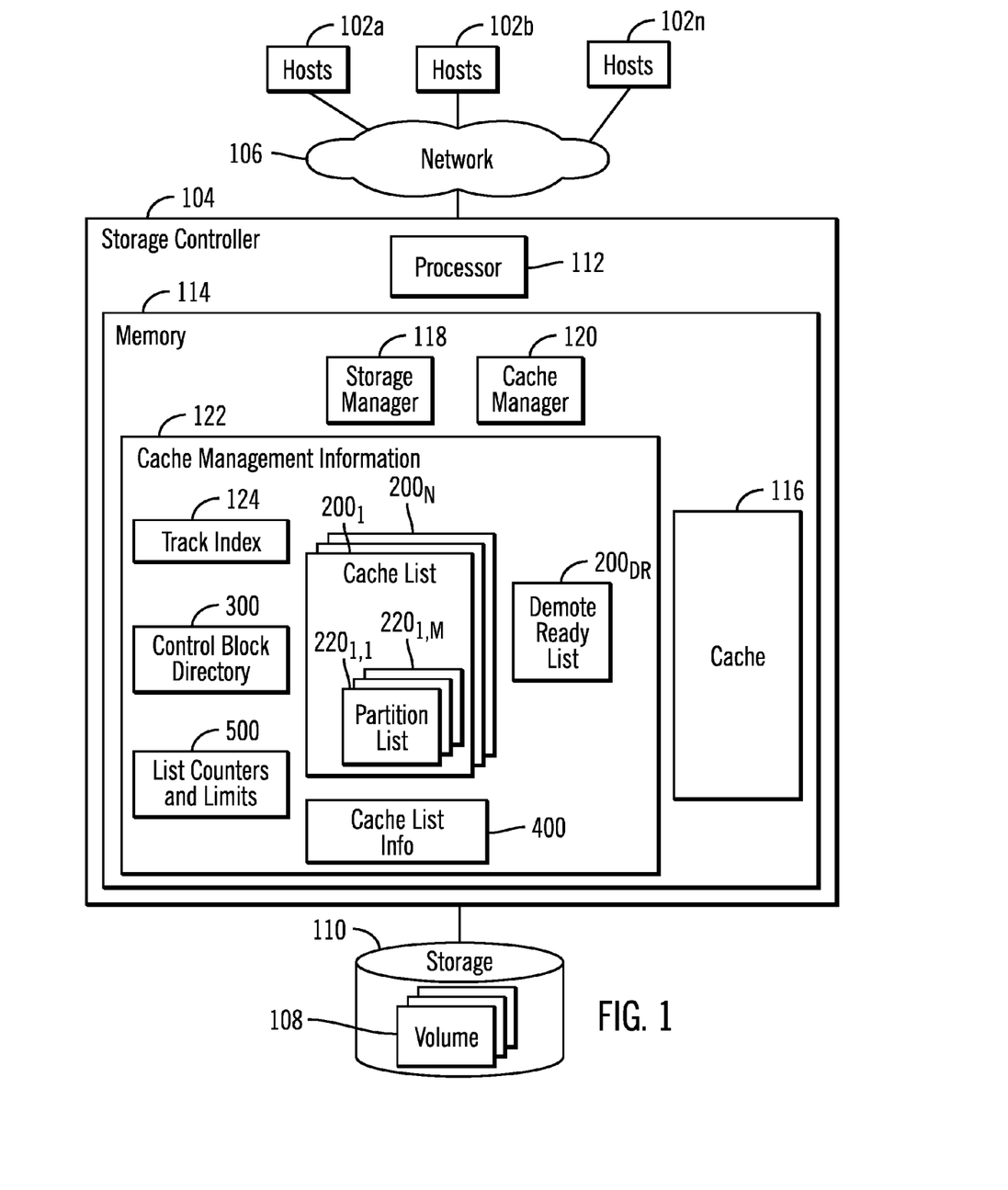
FIG. 1 illustrates an embodiment of a computing environment.

FIG. 1 illustrates an embodiment of a computing environment. A plurality of hosts 102a, 102b . . . 102n may submit Input/Output (I/O) requests to a storage controller 104 over a network 106 to access data at volumes 108 (e.g., Logical Unit Numbers, Logical Devices, Logical Subsystems, etc.) in a storage 110. The storage controller 104 includes one or more processors 112 and a memory 114, including a cache 116 to cache data for the storage 110. The processor 112 may comprise a separate central processing unit (CPU), one or a group of multiple cores on a single CPU, or a group of processing resources on one or more CPUs. The cache 116 buffers data transferred between the hosts 102a, 102b . . . 102n and the volumes 108 in the storage 110.

The memory 114 further includes a storage manager 118 for managing the transfer of tracks transferred between the hosts 102a, 102b . . . 102n and the storage 110 and a cache manager 120 that manages data transferred between the hosts 102a, 102b . . . 102n and the storage 110 in the cache 116. A track may comprise any unit of data configured in the storage 110, such as a track, Logical Block Address (LBA), etc., which is part of a larger grouping of tracks, such as a volume, logical device, etc.

The cache manager 120 maintains cache management information 122 in the memory 114 to manage read (unmodified) and write (modified) tracks in the cache 116. The cache management information 122 may include a track index 124 providing an index of tracks in the cache 116 to cache control blocks in a control block directory 300 and a plurality of lists $200_1$ . . . $200_N$ providing a temporal ordering of tracks in the cache 116. The control block directory 300 includes the cache control blocks, where there is one cache control block for each track in the cache 116 providing metadata on the track in the cache 116. The track index 124 associates tracks with the cache control blocks providing information on the tracks in the cache.

In one embodiment, each of the cache lists $200_1$ . . . $200_N$ include a plurality of partition lists $220_{i,1}$ . . . $220_{i,M}$, as shown with respect to cache list $200_1$, to provide a further subdivision and temporal ordering of the tracks in each of the cache lists $200_i$ based on some attribute of the tracks that are found in the cache lists $200_1$ . . . $200_N$. Partition lists $220_{i,1}$ . . . $220_{i,M}$ comprise the lists for cache list $200_i$. The variables M and N indicating a total number of partition lists and cache lists, and may be the same or different. Each cache lists $200_1$ . . . $200_N$ may have a same number or different number of partition lists. In one embodiment, the lists $200_1$ . . . $200_N$ and $220_1$ . . . $220_M$ may comprise Least Recently Used (LRU) lists. In alternative embodiments, the lists 200 may comprise other types of lists to organize indication of tracks in the cache 116.

Each of the partition lists $220_{i,1}$ . . . $220_{i,M}$ in each of the cache lists $200_i$ may be associated with a particular attribute of a plurality of attributes associated with tracks in the cache lists $200_1$ . . . $200_N$. For instance, in one embodiment, the partition lists $220_{i,1}$ . . . $220_{i,M}$ may each be associated with one of the processors 112 to provide a processor affinity sub-ordering of tracks indicated in the cache lists $200_1$ . . . $200_N$. In alternative embodiments, the partition lists $220_{i,1}$ . . . $220_{i,M}$ may be associated with another attribute of the tracks in the cache lists $200_1$ . . . $200_N$, such as a type of job, application initiating access to the track, priority of application accessing the track, etc. In embodiments where the processor 112 comprises multiple processors and each partition list $220_{i,j}$ is associated with one of the processors $112_j$, such that each of the processors $112_j$ may independently process the partition list $220_{i,j}$ associated with the processor $112_j$, to process the tracks in the cache indicated in the partition lists $220_{i,j}$.

In one embodiment the cache lists $200_1$ . . . $200_N$ may include an active list for random non-Solid State Drive (SSD) tracks, a fast list for random SSD tracks, and an accelerated list for sequential tracks, and a demote ready list $200_{DR}$ indicating a plurality of unmodified tracks that are ready to be demoted from the cache 116. In alternative embodiments, the cache lists may be based on other attributes related to the tracks or the storage 110.

The cache management information 122 further includes cache list information 400 providing information on the cache lists $200_1$ . . . $200_N$ and their partition lists $220_{i,1}$ . . . $220_{i,M}$. List counters and limits 500 are used to determine the status of the cache lists $200_1$ . . . $200_N$ and their cache lists $200_1$ . . . $200_N$ as described below.

The cache manager 120 periodically scans the cache lists $200_1$ . . . $200_N$ and their partition lists $220_1$ . . . $220_M$ to locate unmodified tracks to move to a demote ready list $200_{DR}$ from which tracks are demoted from the cache 116.

The storage manager 118 and cache manager 120 are shown in FIG. 1 as program code loaded into the memory 114 and executed by one or more of the processors 112. Alternatively, some or all of the functions may be implemented in hardware devices in the storage controller 104, such as in Application Specific Integrated Circuits (ASICs).

The storage 110 may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 114 may comprise a suitable volatile or non-volatile memory devices, including those described above.

The network 106 may comprise a Storage Area Network (SAN), a Local Area Network (LAN), a Wide Area Network (WAN), the Internet, and Intranet, etc. Alternatively, the hosts 102a, 102b . . . 102n may connect to the storage controller 104 over a bus interface, such as a Peripheral Component Interconnect (PCI) bus interface and other interfaces known in the art.

Figure 2:
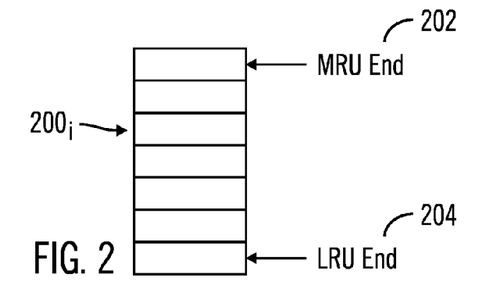
FIG. 2 illustrates an embodiment of a Least Recently Used (LRU) list.

FIG. 2 illustrates an embodiment of the lists $200_i$, $220_{i,j}$ as Least Recently Used (LRU) lists, having a most recently used (MRU) end 202 identifying a track most recently added to the cache 116 or most recently accessed in the cache 116 and a least recently used (LRU) end 204 from which the track identified at the LRU end 204 is selected to demote from the cache 116. The LRU end 204 points to a track identifier, such as a track identifier address or a cache control block index for the track, of the track that has been in the cache 116 the longest for tracks indicated in that list $200_i$, $220_{i,j}$.

Figure 3:
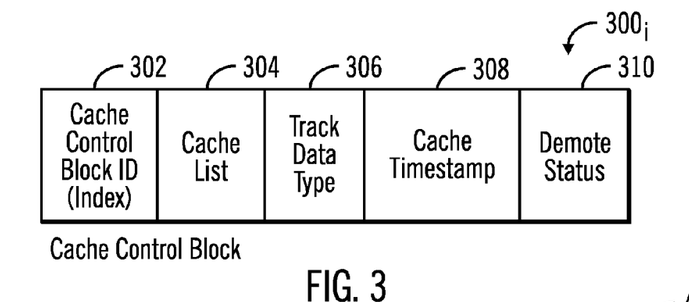
FIG. 3 illustrates an embodiment of a cache control block.

FIG. 3 illustrates an embodiment of an instance of a cache control block $300_i$ for one of the tracks in the cache 116, including, but not limited to, a cache control block identifier 302, such as an index value of the cache control block $300_i$; the LRU list 304, e.g., one of LRU lists $200_i$ in which the track associated cache control block $300_i$ is indicated; a track data type 306, such as unmodified sequentially accessed track, unmodified non-sequentially accessed track, etc.; a cache timestamp 308 indicating a time the track was added to the cache 116; and a demote status 310 indicating whether the track identified by the cache control block $300_i$ is to be demoted from the cache 116.

In certain embodiments, the cache timestamp 308 may be set to a sequence number that that is periodically incremented, such as at every clock cycle or couple of milliseconds. When the track is added to the cache 116, the timestamp 308 is set to the current value for the sequence number.

Figure 4:
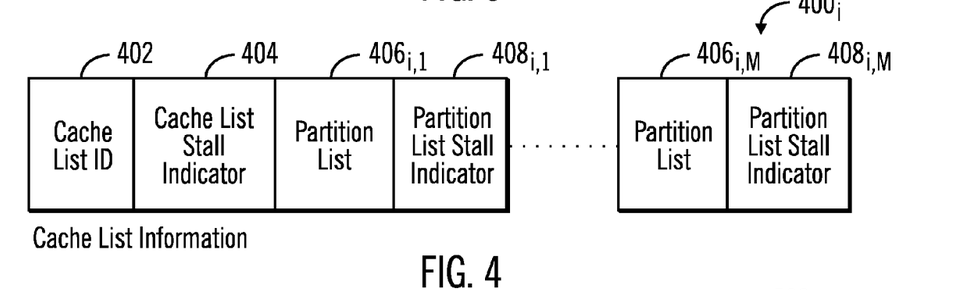
FIG. 4 illustrates an embodiment of cache list information.

FIG. 4 illustrates an embodiment of cache list information $400_i$, maintained for one of the cache lists $200_1 \ldots 200_N$ to provide metadata on cache list $200_i$, including, but not limited to, a cache list identifier (ID) 402; a cache list stall indicator 404 indicating whether the cache list 402 is in a stalled state, which means that the cache list 402 was previously determined to have less than a threshold number of (or zero) unmodified tracks; and partition list information indicating for each partition list $406_{i,1} \ldots 406_{i,M}$ in cache list $200_i$ (field 402) a partition list stall indicator $408_{i,1} \ldots 408_{i,M}$, respectively, indicating whether the corresponding partition list $406_{i,1} \ldots 406_{i,M}$ is in a stalled or not staled state, wherein the stalled state occurs if a determination was recently made that the partition list has no unmodified tracks. A not stalled state occurs if the indicators 404, $408_{i,j} \ldots 408_{i,N}$ are set to indicate not stalled from a stalled state.

Figure 5:
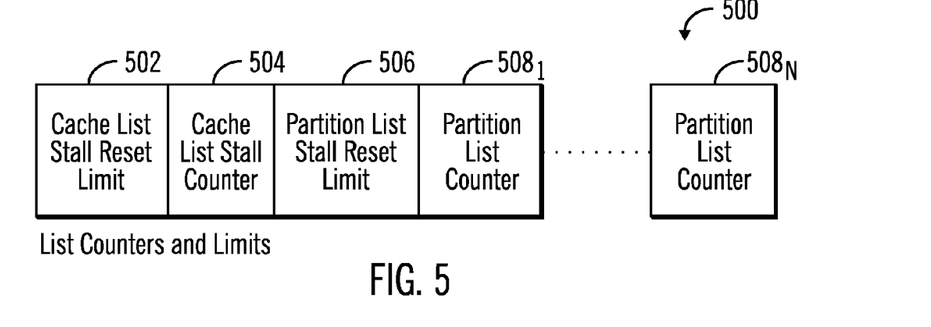
FIG. 5 illustrates an embodiment of list counters and limits.

FIG. 5 illustrates an embodiment of list counters and limits 500 used to determine when to reset the cache list 404 and partition list $406_{i,j}$ stall indicators to the not stalled state so that those lists may be processed. A cache list stall reset limit 502 may be set to an odd number greater than the number N of cache lists $200_1 \ldots 200_N$, and a cache list stall counter 504 keeps tracks of a number of times the cache lists $200_1 \ldots 200_N$ were determined to be in a stalled state, i.e., its stall indicator $404_i$ indicates stalled, when processed for unmodified tracks. A partition list stall reset limit 506 may be set to an odd number greater than an Mth triangular number, were M is the number of partition lists $220_{i,1} \ldots 220_{i,M}$, i.e., the sum of all integers from 1 through M. Partition list counters $508_1 \ldots 508_N$ indicate a number of times the partition lists $220_{i,j}$ for cache lists $200_1 \ldots 200_N$, respectively, were in a stalled state, i.e., their partition list stall indicator $408_{i,j}$ indicated stalled, when processed for unmodified tracks.

Figure 6A:
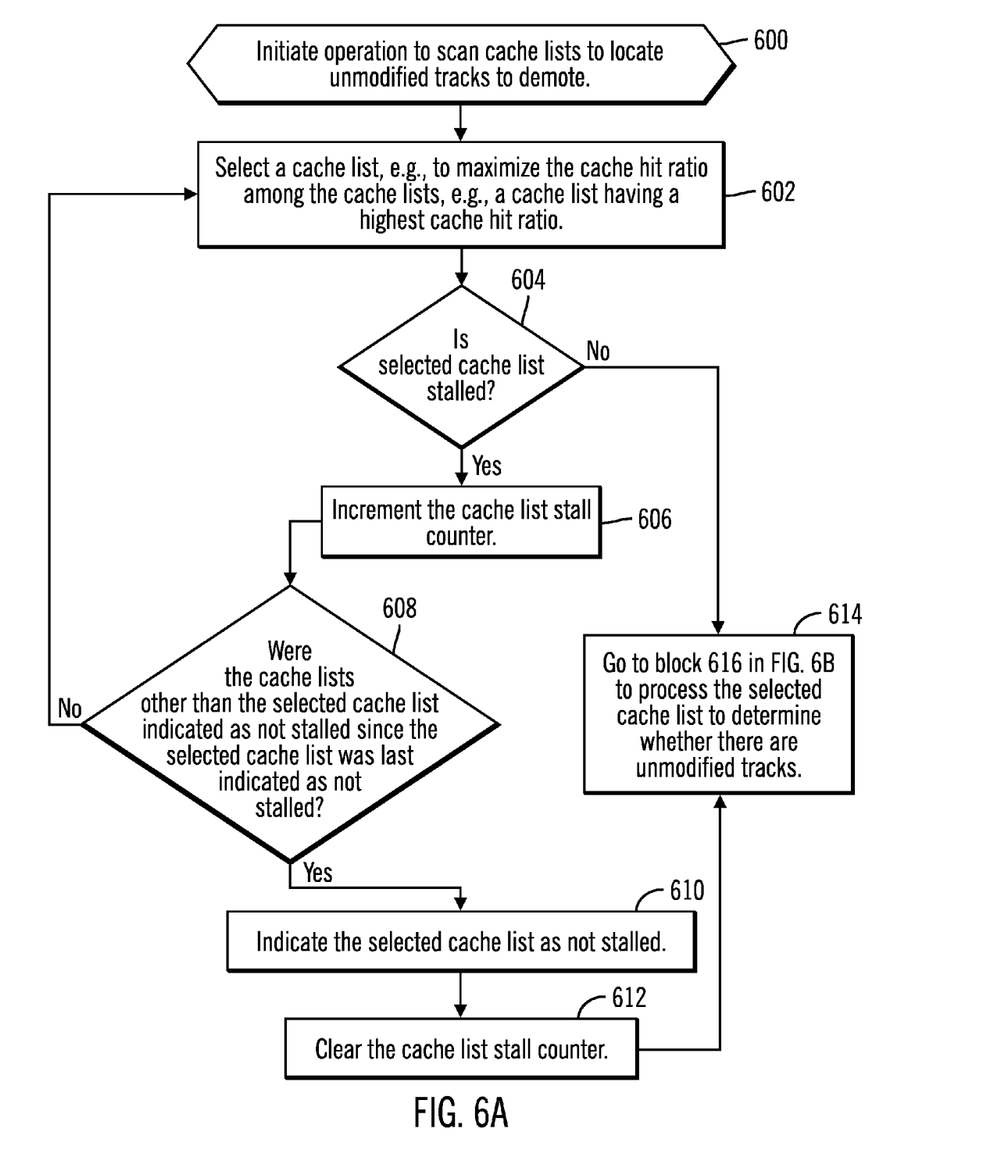
FIGS. 6a, 6b, and 6c illustrate an embodiment of operations to process the cache lists to select tracks for demotion from the cache.
Figure 6B:
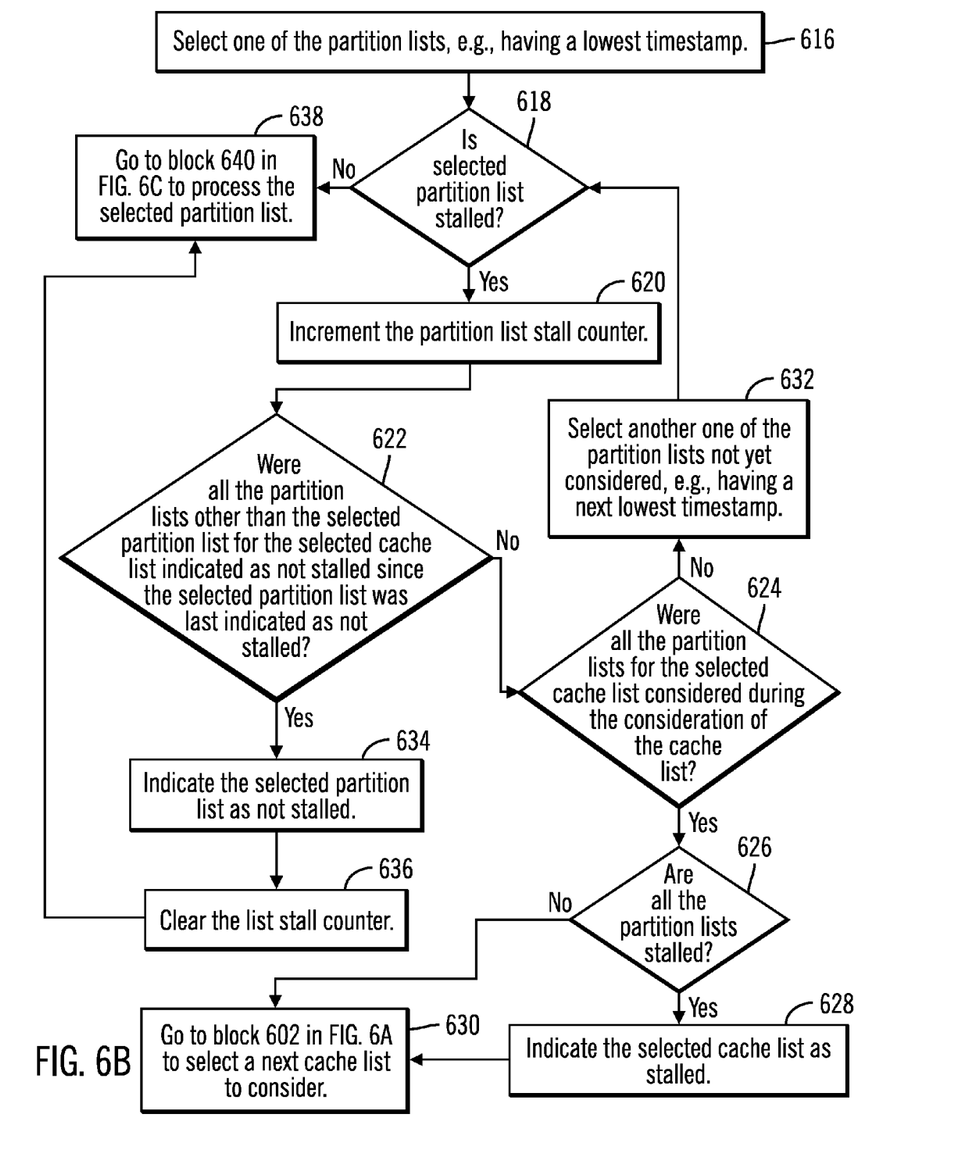
Figure 6C:
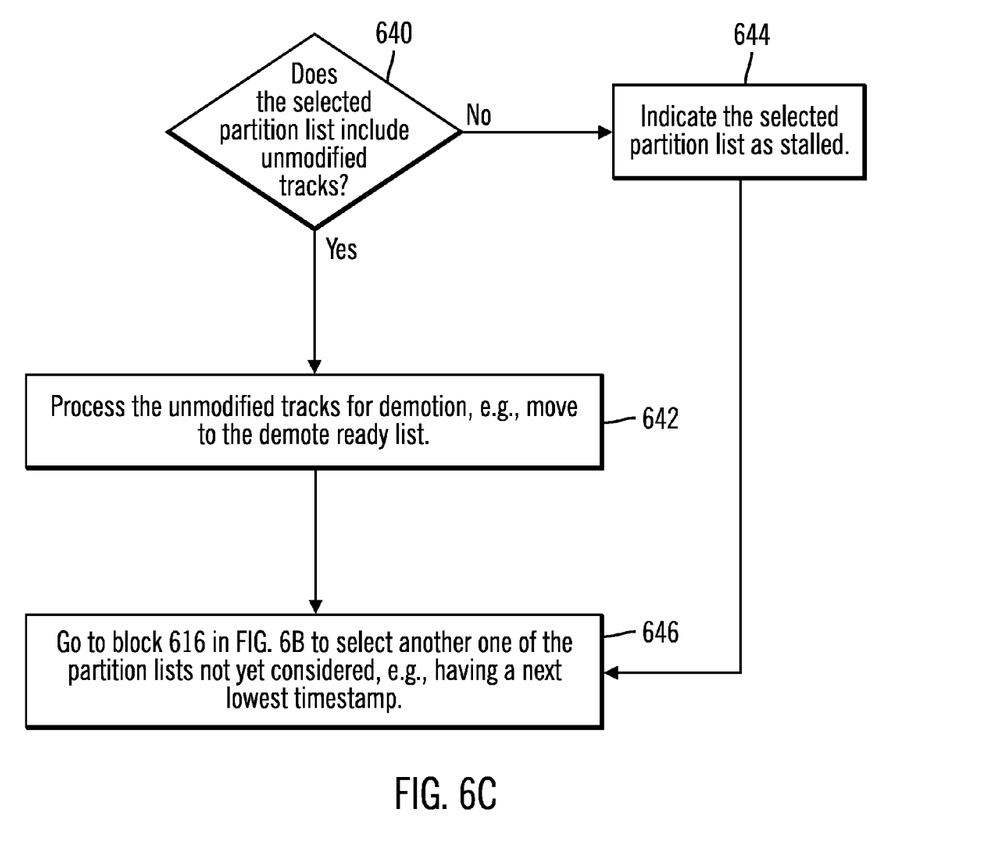

FIGS. 6a, 6b, and 6c illustrate an embodiment of operations performed by the cache manager 120 to process the cache lists $200_1 \ldots 200_N$ and their partition lists $220_{i,1} \ldots 220_{i,M}$ to determine unmodified tracks to process for demotion from the cache 116, which may involve demoting the determined unmodified tracks or moving them to the demote ready list $200_{DR}$, from which tracks are demoted from the cache 116. The cache manager 120 may periodically perform the operations of FIGS. 6a, 6b, 6c to locate unmodified tracks to demote to free space in the cache 116 or perform the operations in response to an event, such as the cache 116 reaching a certain full threshold. Upon initiating (at block 600) the operation to scan the cache lists $200_1 \ldots 200_N$ to locate unmodified tracks to demote, the cache manager 120 selects (at block 602) one of the cache lists $200_1 \ldots 200_N$. In one embodiment, one of the cache lists $200_1 \ldots 200_N$ may be selected to maximize the cache hit ratio among the cache lists $200_1 \ldots 200_N$, such as by selecting the cache list $200_i$ having a highest cache hit rate, or based on some other criteria. If (at block 604) the selected cache list $200_i$ is stalled, e.g., its cache list stall indicator $404_i$ indicates stalled, then the cache list stall counter 504 is incremented (at block 606) and a determination is made (at block 608) as to whether the cache lists $200_1 \ldots 200_N$ other than the selected cache list $200_i$ have been indicated as not stalled since the selected cache list $200_i$ was last indicated as not stalled, where indication may be made by setting the cache list stall indicator 404 for cache list $200_i$ to indicate not stalled.

In one embodiment, the determination at block 608 may be performed by determining whether the cache list stall counter 504 modulo the cache list stall reset limit 502 is zero. A modulo or remainder value of zero indicates that the cache lists $200_1 \ldots 200_N$, other than the selected cache list $200_i$ had their cache list stall indicator 404 reset to indicate "not stalled" since the cache list stall indicator 404 of the selected cache list $200_i$, was last set to indicate as "not stalled". This operation ensures that each of cache lists $200_1 \ldots 200_N$ will have an opportunity to be set to "not stalled" and scanned for unmodified tracks before another cache list $200_i$, is reconsidered. This avoids certain lists from being continually bypassed and left in the stalled state.

If (at block 608) all the cache lists $200_1 \ldots 200_N$ were previously indicated as not stalled from the stalled state since the selected cache list $200_i$, was last indicated as stalled, then the selected cache list $200_i$, is indicated (at block 610) as not stalled, e.g., its cache list stall indicator 404 is reset to not stalled, and the cache list stall counter 504 is reset (at block 612) to zero.

If (at block 608) all the cache lists $200_1 \ldots 200_N$ other than the selected cache list 200i were not previously indicated as not stalled from the stalled state since the selected cache list $200_i$, was last indicated as stalled, then control proceeds back to block 602 to select a another cache list to process.

If (at block 604) the selected cache list $200_i$, is indicated as not stalled or after resetting the cache list stall indicator 404 to indicate not stalled (from block 612), control proceeds (at block 614) to block 616 in FIG. 6b to process the selected cache list $200_i$, that is not in the stalled state to determine whether there are unmodified tracks to demote.

With respect to FIG. 6b, the cache manager 120 selects (at block 616) one of the partition lists $220_{i,1} \ldots 220_{i,M}$ for selected cache list $200_{i,M}$. The selection at block 616 may be based on a criteria, such as the partition lists $220_{i,j} \ldots 220_{i,M}$ having a lowest timestamp. If (at block 618) the selected partition list $220_{i,j}$ is stalled (e.g., the partition list stall indicator $408_{i,j}$ for partition list $200_{i,j}$ indicates stalled), then the partition list stall counter $508_i$, for the selected cache list $200_i$, is incremented (at block 620).

At block 622, a determination is made as to whether all the partition lists $220_{i,1} \ldots 220_{i,M}$ other than the selected partition list $200_{i,j}$ for the selected cache list $200_i$, are indicated as not stalled since the selected partition list $220_{i,j}$ was last indicated as not stalled, e.g., its partition list stall indicator $408_{i,j}$ was reset to indicate not stalled. In one embodiment, the determination at block 622 may be performed by determining whether the partition list stall counter $508_i$ (for the selected cache list $200_i$) modulo the partition list stall reset limit 506 is zero. A modulo or remainder value of zero indicates that the partition lists $220_{i,1} \ldots 220_{i,M}$ for cache list $200_i$ other than the selected partition list $220_{i,k}$ had their partition list stall indicator $408_{i,k}$ reset to indicate "not stalled" since the partition list stall indicator $408_{i,j}$ of the selected partition list $220_{i,j}$ was last indicated as "not stalled". This operation insures that each of the partition lists $220_i \ldots 220_M$ will have an opportunity to be set to "not stalled" and scanned for unmodified tracks before another partition list $220_{i,j}$ is reconsidered. This avoids certain partition lists from being continually bypassed and left in the stalled state.

If (at block 622) not all the other partition lists $220_{i,1} \ldots 220_{i,M}$ had a chance to be reset to not stalled and considered since the partition list $220_{i,j}$ was last processed, then the cache manager 120 determines (at block 624) whether all the partition lists $220_{i,1} \ldots 220_{i,M}$ for the selected cache list $200_i$, were considered during the consideration of the selected cache list $200_i$, and if so, whether (at block 626) all the considered partition lists $220_{i,1} \ldots 220_{i,M}$ were determined to be stalled. If (at block 626) all the considered partition lists $220_{i,1} \ldots 220_{i,M}$ were considered and stalled and the selected partition list $220_{i,j}$ not indicated as not stalled, then the cache manager 120 indicates (at block 628) that the selected cache list $200_i$, is stalled, such as by indicating stalled in the cache list stall indicator 404 for the selected cache list $200_i$. From block 628 or if (from the no branch of block 626) not all the partition lists $220_{i,1} \ldots 220_{i,M}$ were determined to be stalled, then control proceeds (at block 630) back to block 602 in FIG. 6a to select a next cache list $200_i$, to consider for determining unmodified tracks.

If (at block 624) not all the partition lists $220_{i,1} \ldots 220_{i,M}$ were considered, then the cache manager 120 selects (at block 632) another partition list $220_j$, such as one having a next lowest timestamp and control proceeds to block 618 to consider that next selected partition list $220_j$.

If (at block 618) the selected partition list $200_{i,j}$ is not stalled, e.g., the partition list stall indicator $408_{i,j}$ indicates not stalled or after indicating the selected partition list $200_{i,j}$, as not stalled (at blocks 634 and 636), then control proceeds (at block 638) to block 640 in FIG. 6c where the cache manager 120 determines (at block 640) whether the selected partition list $200_{i,j}$ includes unmodified tracks. If so, the unmodified tracks are processed (at block 642) for demotion, such as by adding to the demote ready list $200_{RD}$ or by demoting. If (at block 640) there are no unmodified tracks in the selected partition list $200_{i,j}$, then the selected partition list $200_{i,j}$ is indicated as stalled, i.e., the partition list stall indicator $408_{i,j}$ is set to indicate stalled. From block 644 if the selected partition list $200_{i,j}$ is stalled or after the unmodified tracks are processed for demotion (from block 642), control proceeds (at block 646) back to block 616 in FIG. 6b to select another one of the partition lists $220_{i,1} \ldots 220_{i,M}$ not yet considered, such as one having a next lowest timestamp, to further process for unmodified tracks.

Described embodiments provide techniques for managing multiple cache lists and rotating among indicating a stalled cache list as not stalled to process so that all cache lists have their status changed to not stalled so they are processed for unmodified tracks. Further, described embodiments allow for the cache lists to each be further subdivided into partition lists and processing the partition lists so that stalled partitions may have their status changed to not stalled so they can be processed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
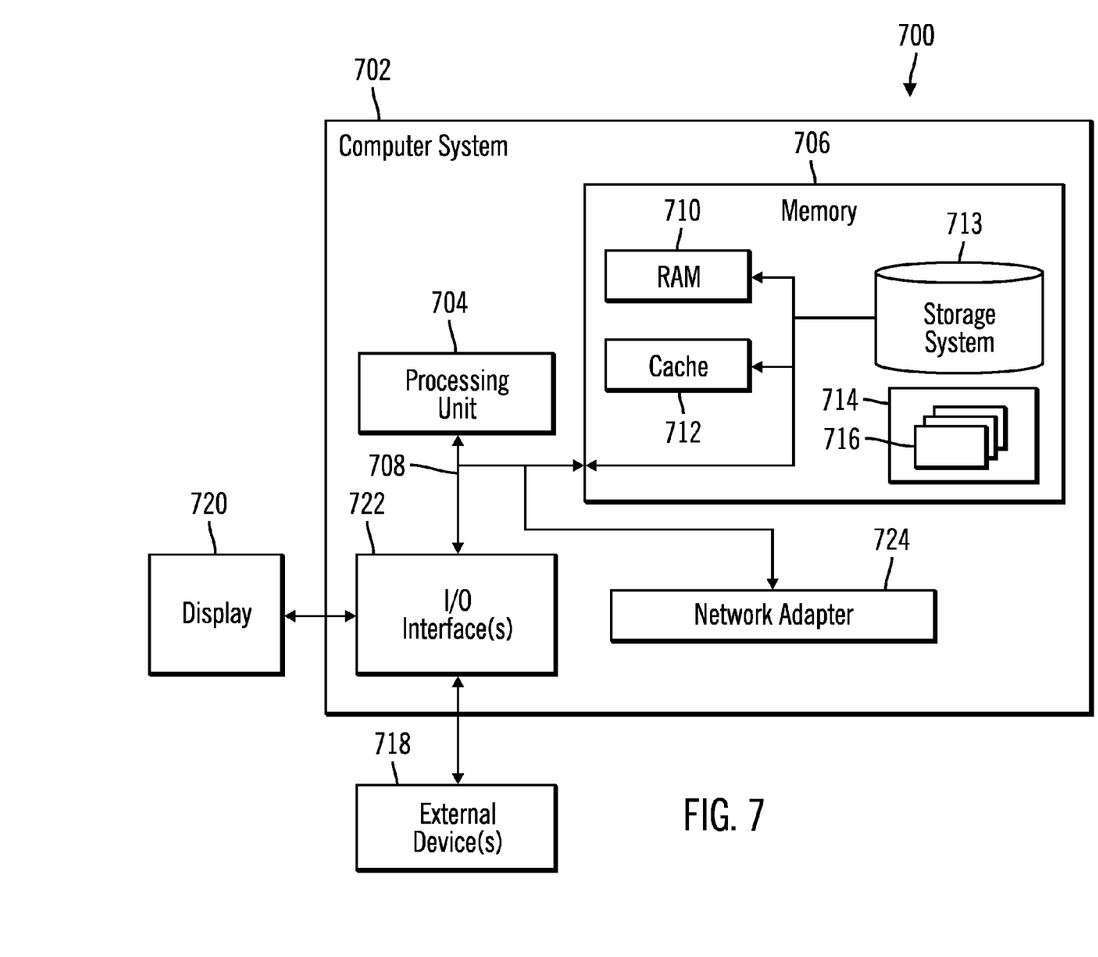
FIG. 7 illustrates a computing environment in which the components of FIG. 1 may be implemented.

The computational components of FIG. 1, including the hosts 102a, 102b . . . 102n and storage controller 104, may be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing tracks in a storage in a cache, the computer program product comprising a computer readable storage medium having computer readable program code embodied therein that when executed performs operations, the operations comprising:

indicating tracks in the storage stored in the cache in a plurality of cache lists, wherein one of the cache lists is indicated as stalled in response to a determination that there are less than a threshold number of unmodified tracks in the cache list;

in response to a selected cache list indicated as stalled, performing:

determining whether the cache lists other than the selected cache list were indicated as not stalled since the selected cache list was last indicated as not stalled;

indicating the selected cache list as not stalled in response to determining that the cache lists other than the selected cache list were indicated as not stalled since the selected cache list was last indicated as not stalled;

processing the selected cache list to determine whether there are determined unmodified tracks in response to indicating the selected cache list as not stalled; and processing the determined unmodified tracks in the selected cache list for demotion from the cache.

2. The computer program product of claim 1, wherein the determining whether the cache lists other than the selected cache list was indicated as not stalled since the selected cache list was last indicated as not stalled comprises:

incrementing a list stall counter for the selected cache list in response to determining that the selected cache list is indicated as stalled;

providing a list stall reset limit comprising an odd number greater than a number of the cache lists; and determining whether the list stall counter modulo the list stall reset limit is zero, wherein the cache lists other than the selected cache list were indicated as not stalled since the selected cache list was last indicated as not stalled in response to the list stall counter modulo the list stall reset limit being zero.

3. The computer program product of claim 1, wherein the operations further comprise:

in response to the selected cache list indicated as not stalled, performing:

processing unmodified tracks in the selected cache list for demotion; and indicating the selected cache list as stalled in response to determining that the selected cache list does not include unmodified tracks.

4. The computer program product of claim 1, wherein the operations further comprise:

selecting a next cache list of the cache lists in response to determining that the cache lists other than the selected cache list were not indicated as stalled since the selected cache list was last indicated as stalled; and performing for the selected next cache list another iteration of the determining whether the cache lists other than the selected cache list were indicated as not stalled, indicating the selected cache list as not stalled, processing the selected cache list, and moving the unmodified tracks in response to the selected next cache list indicated as stalled.

5. The computer program product of claim 1, wherein each of the cache lists include a plurality of partition lists, wherein each of the partition lists are indicated as stalled in response to a determination that there are no unmodified tracks in the partition list, wherein the processing the selected cache list to determine whether there are unmodified tracks comprises:

selecting a partition list of the partition lists for the selected cache list;

in response to the selected partition list indicated as stalled, performing:

determining whether the partition lists other than the selected partition list were indicated as stalled since the selected partition list was last indicated as stalled;

indicating the selected partition list as not stalled in response to determining that all the other partition lists for the selected cache list were indicated as not stalled since the selected partition list was last indicated as not stalled;

processing the selected partition list to determine whether there are determined unmodified tracks in response to indicating the selected partition list as not stalled; and processing the determined unmodified tracks in the selected partition list for demotion.

6. The computer program product of claim 5, wherein the determining whether a stall indicator for the selected cache list to indicate stalled;

selecting a next cache list of the cache lists in response to indicating the selected cache list as stalled; and further performing for the selected next cache list another iteration of the determining whether the cache lists other than the selected cache list were indicated as not stalled, indicating as not stalled, processing the selected cache list, and moving the unmodified tracks in response to the selected next cache list indicated as stalled.

7. The computer program product of claim 5, wherein the operations further comprise:

in response to the selected partition list indicating not stalled, performing:

processing unmodified tracks in the selected partition list for demotion; and indicating the selected partition list as stalled in response to determining that the selected partition list does not include unmodified tracks.

8. The computer program product of claim 5, wherein the operations further comprise:

selecting a next selected partition list of the partition lists for the selected cache list in response to determining that all the partition lists other than the selected partition list were not indicated as not stalled since the selected partition list was last indicated as not stalled; and further performing for the next selected partition list another iteration of the determining whether the partition lists other than the selected partition list were indicated as not stalled indicating the selected partition list as not stalled, processing the selected partition list, and moving the unmodified tracks in response to the next selected partition list indicated as stalled.

9. The computer program product of claim 8, wherein the operations further comprise:

after processing each of the partitions lists indicated as stalled without changing the indication to not stalled, setting a stall indicator for the selected cache list to indicate stalled;

selecting a next selected cache list of the cache lists in response to indicating the selected cache list as stalled; and further performing for the next selected cache list another iteration of the determining whether the cache lists other than the selected cache list were indicated as not stalled, indicating as not stalled, processing the selected cache list, and moving the unmodified tracks in response to the next selected cache list indicated as stalled.

10. The computer program product of claim 5, wherein the operations further comprise:

in response to the selected partition list not including unmodified tracks after indicating the selected partition list as stalled and all the partition lists for the selected cache list indicating stalled, performing:

indicating the selected cache list as stalled in response to all the partition lists for the selected cache list indicated as stalled; and selecting a next of the cache lists to process for unmodified tracks.

11. The computer program product of claim 5, wherein the selected cache list is selected to maximize cache hits among the cache lists, and wherein the selected partition list has a track with a next lowest timestamp among the tracks in the partition lists other than a last considered selected partition list.

12. The computer program product of claim 5, wherein the cache lists include an active list for random non-Solid State Drive (SSD) tracks, a fast list for random SSD tracks, and an accelerated list for sequential tracks, wherein each of the partition lists in each of the cache lists are used to indicate tracks having an attribute of a plurality of attributes associated with tracks in the cache lists.

13. A system in communication with a storage having tracks, comprising:

a processor;

a cache;

a computer readable storage medium having program code that in response to execution by the processor performs operations, the operations comprising:

indicating tracks in the storage stored in the cache in a plurality of cache lists, wherein one of the cache lists is indicated as stalled in response to a determination that there are less than a threshold number of unmodified tracks in the cache list;

in response to a selected cache list indicated as stalled, performing:

determining whether the cache lists other than the selected cache list were indicated as not stalled since the selected cache list was last indicated as not stalled;

indicating the selected cache list as not stalled in response to determining that the cache lists other than the selected cache list were indicated as not stalled since the selected cache list was last indicated as not stalled;

processing the selected cache list to determine whether there are determined unmodified tracks in response to indicating the selected cache list as not stalled; and processing the determined unmodified tracks in the selected cache list for demotion from the cache.

14. The system of claim 13, wherein the determining whether the cache lists other than the selected cache list was indicated as not stalled since the selected cache list was last indicated as not stalled comprises:

incrementing a list stall counter for the selected cache list in response to determining that the selected cache list is indicated as stalled;

providing a list stall reset limit comprising an odd number greater than a number of the cache lists; and determining whether the list stall counter modulo the list stall reset limit is zero, wherein the cache lists other than the selected cache list were indicated as not stalled since the selected cache list was last indicated as not stalled in response to the list stall counter modulo the list stall reset limit being zero.

15. The system of claim 13, wherein each of the cache lists include a plurality of partition lists, wherein each of the partition lists are indicated as stalled in response to a determination that there are no unmodified tracks in the partition list, wherein the processing the selected cache list to determine whether there are unmodified tracks comprises:

selecting a partition list of the partition lists for the selected cache list;

in response to the selected partition list indicated as stalled, performing:
  determining whether the partition lists other than the selected partition list was indicated as stalled since the selected partition list was last indicated as stalled;
  indicating the selected partition list as not stalled in response to determining that all the other partition lists for the selected cache list were indicated as not stalled since the selected partition list was last indicated as not stalled;
  processing the selected partition list to determine whether there are determined unmodified tracks in response to indicating the selected partition list as not stalled; and
  processing the determined unmodified tracks in the selected partition list for demotion.

16. The system of claim 15, wherein the determining whether the partition lists other than the selected partition list for the selected cache list were indicated as not stalled since the selected partition list was last indicated as not stalled comprises:
  incrementing a partition list stall counter for the selected cache list in response to determining that the selected partition list is indicated as stalled;
  providing a partition list stall reset limit comprising an odd number greater than an Mth triangular number, where M is a number of the partition lists in the selected cache list; and
  determining whether the partition list stall counter modulo the partition list stall reset limit is zero, wherein the partition lists for the cache lists other than the selected partition list were indicated as not stalled since the selected partition list was last indicated as not stalled in response to the partition list stall counter modulo the partition list stall reset limit being zero.

17. The system of claim 15, wherein the operations further comprise:
  in response to the selected partition list not including unmodified tracks after indicating the selected partition list as stalled and all the partition lists for the selected cache list indicating stalled, performing:
    indicating the selected cache list as stalled in response to all the partition lists for the selected cache list indicated as stalled; and
    selecting a next of the cache lists to process for unmodified tracks.

18. A method for managing tracks in a storage in a cache, comprising:
  indicating tracks in the storage stored in the cache in a plurality of cache lists, wherein one of the cache lists is indicated as stalled in response to a determination that there are less than a threshold number of unmodified tracks in the cache list;
  in response to a selected cache list indicated as stalled, performing:
    determining whether the cache lists other than the selected cache list were indicated as not stalled since the selected cache list was last indicated as not stalled;
    indicating the selected cache list as not stalled in response to determining that the cache lists other than the selected cache list were indicated as not stalled since the selected cache list was last indicated as not stalled;
    processing the selected cache list to determine whether there are determined unmodified tracks in response to indicating the selected cache list as not stalled; and
    processing the determined unmodified tracks in the selected cache list for demotion from the cache.

19. The method of claim 18, wherein the determining whether the cache lists other than the selected cache list was indicated as not stalled since the selected cache list was last indicated as not stalled comprises:
  incrementing a list stall counter for the selected cache list in response to determining that the selected cache list is indicated as stalled;
  providing a list stall reset limit comprising an odd number greater than a number of the cache lists; and
  determining whether the list stall counter modulo the list stall reset limit is zero, wherein the cache lists other than the selected cache list were indicated as not stalled since the selected cache list was last indicated as not stalled in response to the list stall counter modulo the list stall reset limit being zero.

20. The method of claim 18, wherein each of the cache lists include a plurality of partition lists, wherein each of the partition lists are indicated as stalled in response to a determination that there are no unmodified tracks in the partition list, wherein the processing the selected cache list to determine whether there are unmodified tracks comprises:
  selecting a partition list of the partition lists for the selected cache list;
  in response to the selected partition list indicated as stalled, performing:
    determining whether the partition lists other than the selected partition list was indicated as stalled since the selected partition list was last indicated as stalled;
    indicating the selected partition list as not stalled in response to determining that all the other partition lists for the selected cache list were indicated as not stalled since the selected partition list was last indicated as not stalled;
    processing the selected partition list to determine whether there are determined unmodified tracks in response to indicating the selected partition list as not stalled; and
    processing the determined unmodified tracks in the selected partition list for demotion.

21. The method of claim 20, wherein the determining whether the partition lists other than the selected partition list for the selected cache list were indicated as not stalled since the selected partition list was last indicated as not stalled comprises:
  incrementing a partition list stall counter for the selected cache list in response to determining that the selected partition list is indicated as stalled;
  providing a partition list stall reset limit comprising an odd number greater than an Mth triangular number, where M is a number of the partition lists in the selected cache list; and
  determining whether the partition list stall counter modulo the partition list stall reset limit is zero, wherein the partition lists for the cache lists other than the selected partition list were indicated as not stalled since the selected partition list was last indicated as not stalled in response to the partition list stall counter modulo the partition list stall reset limit being zero.

22. The method of claim 20, further comprising:
  in response to the selected partition list not including unmodified tracks after indicating the selected partition list as stalled and all the partition lists for the selected cache list indicating stalled, performing:

indicating the selected cache list as stalled in response to all the partition lists for the selected cache list indicated as stalled; and selecting a next of the cache lists to process for unmodified tracks.

\* \* \* \* \*